United States Patent [19]
Coelho et al.

[11] Patent Number: 5,620,137
[45] Date of Patent: Apr. 15, 1997

[54] ROOM ACCESS CONTROL AND POWER MANAGEMENT INSTALLATION

[75] Inventors: Jean-Louis Coelho, Saint Nom la Breteche; Jean-Noël Marteau, Marly le Roi, both of France

[73] Assignee: Societe Francaise d'Estudes Electroniques S F 2 E, Le Mesnil Saint Denis, France

[21] Appl. No.: 513,148

[22] Filed: Aug. 9, 1995

[30]  Foreign Application Priority Data

Aug. 10, 1994  [FR]  France ................... 94 09906

[51] Int. Cl.⁶ .......................... G05D 23/00; F28F 27/00
[52] U.S. Cl. .................................. 236/47; 165/11.1
[58] Field of Search ............... 236/47, 1 R; 165/11.1

[56]  References Cited

U.S. PATENT DOCUMENTS

| | | | |
|---|---|---|---|
| 4,058,740 | 11/1977 | Dalton et al. | 307/116 |
| 4,223,301 | 9/1980 | Grimes et al. | 340/500 |
| 4,319,712 | 3/1982 | Bar | 236/47 |
| 4,801,082 | 1/1989 | Harwood, Jr. | 236/46 R |
| 5,088,645 | 2/1992 | Bell | 165/11.1 |

FOREIGN PATENT DOCUMENTS

| | | | |
|---|---|---|---|
| 0200635 | 11/1986 | European Pat. Off. | |
| 0341022 | 11/1989 | European Pat. Off. | 236/47 |

OTHER PUBLICATIONS

"Raumbus versorgt und informiert", Elektrotechnik, Oct. 13, 1989, vol. 71, No. 7, pp. 53–55.

B. Schade, "Infrared remote controlled air conditioners offer greater comfort", Siemens Power Engineering & Automation, 1986, vol. 8, No. 2, pp. 100–101.

*Primary Examiner*—William E. Wayner
*Attorney, Agent, or Firm*—Loeb & Loeb LLP

[57]  ABSTRACT

A room access control and energy management installation controls the air conditioning of the room, such as a hotel room, in accordance with conditions of occupancy of the room. The air conditioning of the room is controlled by a controller which receives data representing a selected operating regime produced by a computer on the basis of parameters such as the time of day, the probability of imminent occupation of the room or actual occupation of the room.

10 Claims, 1 Drawing Sheet

ROOM ACCESS CONTROL AND POWER MANAGEMENT INSTALLATION

BACKGROUND OF THE INVENTION

1. Field of the Invention

The invention concerns the air conditioning of a room such as a hotel room, for example; one object of the invention is to combine access control and energy management, in particular air conditioning management, according to a number of parameters including one parameter representing the presence in the room of a legitimate occupant.

2. Description of the Prior Art

U.S. Pat. No. 4,319,712 describes an air conditioner control system conditioned by the detection of the presence of a key in a specific module inside the room to be air conditioned. A system of this kind has drawbacks in that the occupant may forget to insert their key in the specific place to turn on the air conditioning, or may not understand that this is necessary. Also, it often takes a fairly long time for the room to reach a comfortable temperature. The invention provides a solution to all these problems.

SUMMARY OF THE INVENTION

The invention consists in a room access control and energy management installation including a lock governed by an access code controlling entry to said room, code entry means accessible from outside said room and adapted to enable at least opening of said lock, an air conditioner for air conditioning said room, an air conditioning controller for selecting one of a plurality of predetermined air conditioning operating regimes including a nominal operating regime, a computer for calculating said operating regime having a data input connected to sensor means for producing a signal or a code indicating that said lock is locked from the inside, said nominal operating regime being selected when said signal or code is received from said sensor means.

Accordingly, nominal operation of the air conditioner is conditioned in particular by the fact that the occupant locks the door from the inside. Other parameters are processed to determine one or more other operating regimes, for example whether a named occupant is in the room or not, whether (if the occupant is not in the room) their arrival is probable or not, or so on.

The invention will be better understood and other advantages of the invention will emerge more clearly from the following description of an air conditioning management installation of the invention given by way of example only and with reference to the appended drawings.

DETAILED DESCRIPTION OF THE PREFERRED EMBODIMENT

Figure 1:
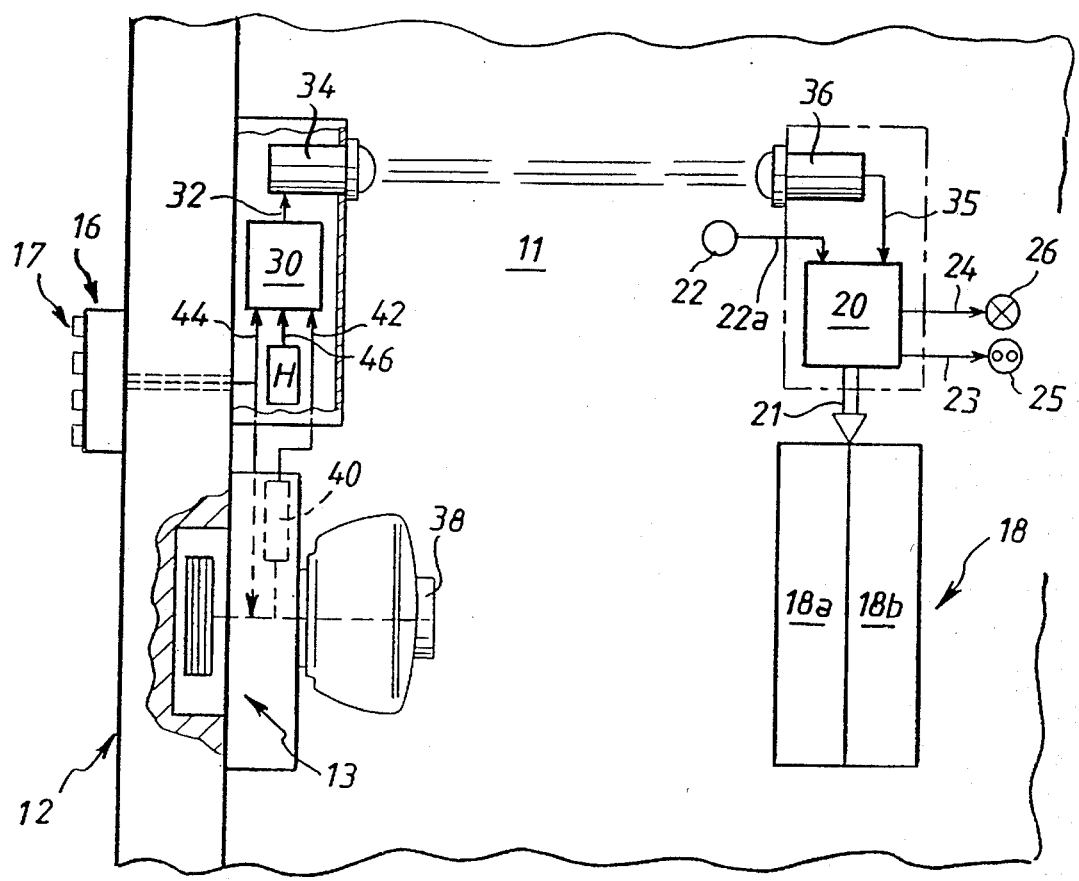
FIG. 1 is a block diagram of an installation in accordance with the invention for managing the air conditioning of a room.

FIG. 1 is a diagrammatic representation of an installation for management of the air conditioning of a room 11 (a hotel room, for example) access to which is controlled by a door 12 fitted with a lock 13 of the type with an access code, opening at least of which is subject to entry of the code on code entry means 16 accessible from the outside of the room and in this example including a keypad 17 mounted on the outside of the door 12 or near the latter.

The output of the code entry means 16 is therefore connected in such a way as to open the lock 13, in an arrangement that is known in itself. Of course, the entry means 16 could incorporate a key or card reader in place of the keypad.

The installation further includes an air conditioner 18 for air conditioning the room and an air conditioner controller 20 adapted to select one of a plurality of predetermined operating regimes of the air conditioner. These operating regimes include a nominal regime selected when a person entitled to be there is present in the room. The controller 20 includes a microprocessor-based electronic circuit with a plurality of data inputs and a control output 21 to the air conditioner. In the example described the air conditioner 18 includes a cooler 18a and a heater 18b. The temperature in the room is measured by a temperature sensor 22 connected to a data input 22a of the controller 20. Accordingly, depending on changes in the room temperature, the air conditioner can be started to warm or to cool the room to maintain it in a given range of temperature, this range depending on the selected operating regime (see below).

The controller 20 advantageously includes control outputs 23, 24 authorizing the use of an electrical power distribution system 25 and an electrical lighting system 26 specific to the room. In this way the two systems can be disconnected according to the selected operating regime of the air conditioner, in particular if the latter is not the nominal operating regime. Additionally, the system can easily be installed in an existing room since it does not require any additional wiring.

The installation further includes a computer 30 for calculating the operating regime of the air conditioner. The computer includes a microprocessor-based electronic circuit with a plurality of data inputs and an output 32 connected to said controller 20. The signals at the output 32 represent an operating regime of the air conditioner selected in the manner explained below.

Referring to FIG. 1, the operating regime calculating means is placed near the entry to the room, i.e. near the lock 13, whereas the air conditioning controller 20 is at some distance from said calculating means, preferably near the air conditioner 18. In the example described, the installation includes an infra red link between said calculating means and said controller. In this way the output 32 of the calculating means 30 is connected to an infra red transmitter 34 and a data input 35 of the controller 20 is connected to an infra red receiver 36 facing the transmitter 34. These infra red transmitters and receivers are well known in themselves and are routinely used in remote control systems for audio-visual equipment. They are associated with encoders and decoders adapted to apply to the input 35 of the controller 20 information representing the operating regime selected by the calculating means 30. The infra red link could be replaced by a radio or carrier current link.

In a manner that is known in itself a lock 13 has a locking button 38 operable only from inside the room 11 and used to lock the door 12 from the inside. This button is associated with an electrical or like transducer 40 supplying a signal indicating that the lock 13 has been locked from the inside. The output of the transducer 40 is connected to a data input 42 of the calculating means 30. The output of the code entry means 16 is connected to a data input 44 of the calculating means 30. Another data input 46 of the calculating means 30 is connected to a digital output of an electronic clock H.

A specific code is confided to the person legitimately occupying the room 11. In the case of a hotel room, the guest receives a particular access code that can be entered into the system via the keypad 17. A conventional consequence of entering this access code is unlocking of the lock 13. The same code is recognized by the calculating means 30. The code of the person occupying the room includes an indication of the duration of their stay beyond which the energy control system can select a minimum power consumption standby regime. Other codes can also enable access to the room. For example, one code can be assigned to the manager and another code to the cleaning staff. The manger's code could indicate to the calculating means 30 whether the room is occupied or not, for example. The cleaning personnel code could indicate whether the room has just been vacated, and so on. The guest's code could tell the calculating means 30 that the room is occupied (i.e. not available to other guests) (at the time of the first entry of the code). A clock H sends time information to the calculating means 30 at all times, to enable it to distinguish "slack" time periods from "busy" time periods. The slack time period is that in which guests rarely return to the hotel. The busy period is that in which guests are usually present in the hotel in large numbers. The transducer 40 tells the calculating means 30 that the guest is actually present in the room, since they have locked the door from the inside. The calculating means 30 manages all these parameters to determine four different operating regimes R1 through R4 of the air conditioner. The regimes R1 through R4 (in this order) represent increasing levels of energy consumption. The regime R4 is the nominal operating regime previously referred to. The table below summarizes one example of the conditions for selecting a given operating regime.

| Conditions | | - Room not occupied | - Room occupied - Guest absent - Slack time | - Room occupied - Guest absent - Busy time | - Room occupied - Guest present |
|---|---|---|---|---|---|
| R1 | Standby | X | | | |
| R2 | Low intermediate power | | X | | |
| R3 | High intermediate power | | | X | |
| R4 | Full power, nominal operation | | | | X |

Note that when the room is occupied (i.e. when the guest's code has been identified) and the guest is present in the room 11, the nominal operating regime is selected immediately, implying that the temperature is maintained within relatively close limits, selected by the guest using a thermostat associated with the air conditioner 18. Thus the guest turns on the air conditioner by locking the door of the room. At the same time, the controller 20 enables use of the electrical power distribution system 25 and the lighting system 26.

The other operating regimes allow the temperature in the room to vary within increasingly wide limits dependent on heat exchange with the outside environment. The temperature limits are explained with reference to FIG. 2.

This figure shows eight temperatures T1 through T8 along the ordinate axis. On the abscissa axis the area OA represents operation of the air conditioner under the first regime defined above, i.e. that implying minimum power consumption. It can be seen that the temperature can vary without restriction between the temperatures T1 and T8. In the example shown, the temperature represented by curve T rises freely until the cooler 18a stabilizes it at the temperature T8. The conditions change between points A and B such that the operating regime selected is the second operating regime R2 in which the temperature can vary freely between T2 and T7. Consequently, the temperature is reduced gradually from T8 to T7 by the cooler 18a and then stabilizes at T7. From B to C the operating regime is the third regime R3 defined above in which the temperature can vary freely between T3 and T6. Consequently, the temperature falls from T7 initially to T6 and then stabilizes at that value. Beyond C the parameters change and in particular locking of the lock from the inside indicates that the guest is present in the room. In this case, the guest can choose any temperature in the range T1–T8, for example. The diagram assumes that the guest sets the thermostat of the air conditioner to the value T5. Consequently the temperature is reduced by the cooler 18a from T6 initially to T5, at which it stabilizes.

The nominal operating regime provides the possibility of automatic modification of the set temperature in accordance with the time of day. Typically, the temperature set on the thermostat is the set point temperature near which the temperature of the room stabilizes during only a first time period. During a second time period (overnight, for example) the system gradually reduces the set point temperature to a given value below the programmed set point value, for example T4. This is shown beyond point D where the nominal operating regime autonomously changes the set point temperature from T5 to T4. The temperature in the room therefore stabilizes at T4 during the night before returning automatically to T5 in the morning.

Figure 2:
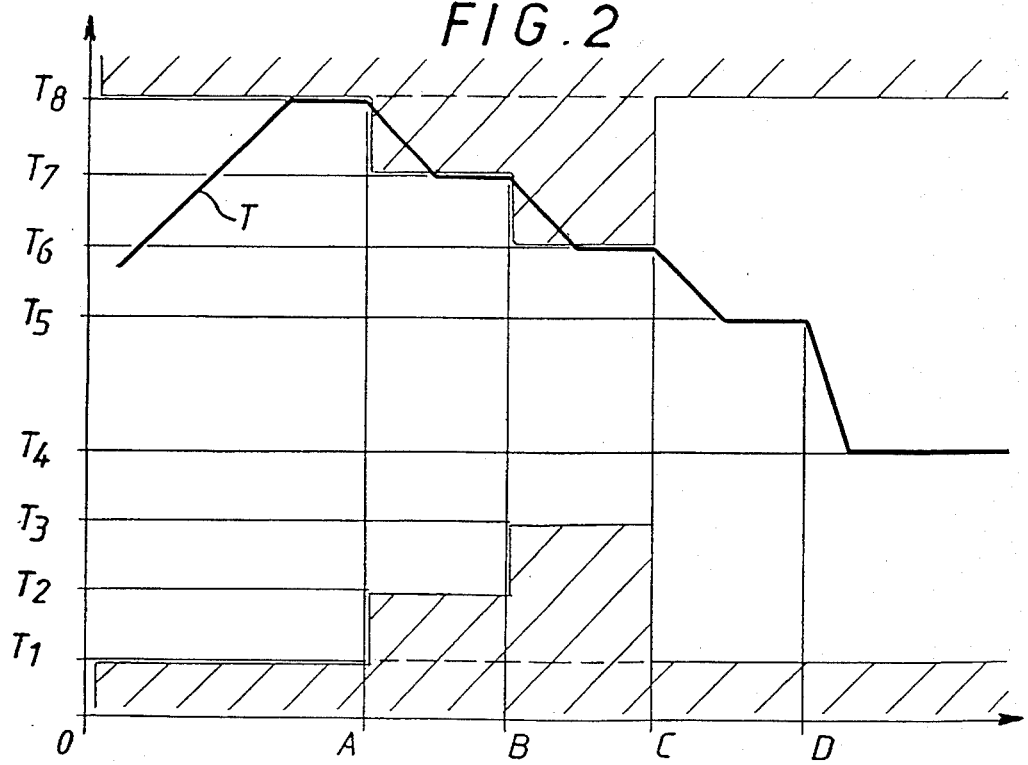
FIG. 2 is a graph showing how the temperature in the room varies according to the selected operating regime of the air conditioner.

Of course, the example just described with reference to FIG. 2 corresponds to a high outdoor temperature (summer) and operation of the air conditioner to cool the room. In winter the temperature in the room can fall to T1 if the room is not occupied and rise to a value chosen by the guest if the room is occupied and the guest is present in the room.

Note that the temperature thresholds T1, T2, T3, T6, T7, T8 are set by the management, as required by the individual room. The temperature T5 (and consequently T4) is set by the guest anywhere in the range T1–T8 or in a narrower range. The slack and busy times and said first and second time periods can also be determined at will.

There is claimed:

1. Room access control and energy management installation including a lock governed by an access code controlling entry to said room, code entry means accessible from outside said room and adapted to enable at least opening of said lock, an air conditioner for air conditioning said room, an air conditioning controller for selecting one of a plurality of predetermined air conditioning operating regimes including a nominal operating regime, a computer for calculating said operating regime having a data input connected to sensor means for producing a signal or a code indicating that said lock is locked from the inside, said nominal operating regime being selected when said signal or code is received from said sensor means.

2. Installation according to claim 1 wherein a data input of said calculating means is connected to said code entry means.

3. Installation according to claim 1 wherein a data input of said calculating means is connected to a clock.

4. Installation according to claim 1 wherein said air conditioning controller has a data input connected to an ambient temperature sensor in said room.

5. Installation according to claim 1 wherein said operating regime calculating means is placed near the entry of said room and said air conditioning controller is at a distance from said calculating means, preferably near said air conditioner.

6. Installation according to claim 5 including an infra red link between said calculating means and said controller.

7. Installation according to claim 1 wherein the code read by said code entry means includes information representative of the occupant or of the code holder.

8. Installation according to claim 1 which is autonomous and entirely contained within said room.

9. Room access control and energy management installation including a door for permitting access to a room, a lock installed in said door, entry means usable from outside said room for opening said lock, an air conditioner for air conditioning said room, an air conditioning controller for selecting at least one air conditioning operating regime, a sensor for indicating that said door has been locked from the inside, and a computer for causing said air conditioning controller means to select the one operating regime when said sensor indicates that said door is locked from the inside.

10. Installation according to claim 1 wherein said lock includes means for locking said lock from inside said room.

* * * * *